United States Patent
Du et al.

(10) Patent No.: US 12,216,999 B2
(45) Date of Patent: Feb. 4, 2025

(54) LEARNING TO EXTRACT ENTITIES FROM CONVERSATIONS WITH NEURAL NETWORKS

(71) Applicant: Google LLC, Mountain View, CA (US)

(72) Inventors: Nan Du, San Jose, CA (US); Linh Mai Tran, Mountain View, CA (US); Yu-Hui Chen, Cupertino, CA (US); Izhak Shafran, Portland, OR (US)

(73) Assignee: Google LLC, Mountain View, CA (US)

( * ) Notice: Subject to any disclaimer, the term of this patent is extended or adjusted under 35 U.S.C. 154(b) by 770 days.

(21) Appl. No.: 17/432,259

(22) PCT Filed: Feb. 19, 2020

(86) PCT No.: PCT/US2020/018899
§ 371 (c)(1),
(2) Date: Aug. 19, 2021

(87) PCT Pub. No.: WO2020/172329
PCT Pub. Date: Aug. 27, 2020

(65) Prior Publication Data
US 2022/0075944 A1    Mar. 10, 2022

Related U.S. Application Data (60) Provisional application No. 62/807,741, filed on Feb. 19, 2019.

(51) Int. Cl.
*G06F 40/279* (2020.01)
*G06F 40/284* (2020.01)
(Continued)

(52) U.S. Cl.
CPC .......... *G06F 40/284* (2020.01); *G06F 40/295* (2020.01); *G06N 3/045* (2023.01); *G06F 40/279* (2020.01)

(58) Field of Classification Search
CPC .............................. G06F 40/295; G06F 40/279
See application file for complete search history.

(56) References Cited

U.S. PATENT DOCUMENTS

| | | | |
|---|---|---|---|
| 2008/0235018 A1* | 9/2008 | Eggen | G10L 15/26 704/E15.045 |
| 2014/0280353 A1* | 9/2014 | Delaney | G16H 10/60 707/794 |
| 2015/0100524 A1* | 4/2015 | Pantel | G06N 20/00 706/12 |

FOREIGN PATENT DOCUMENTS

| CN | 106095749 A | * 11/2016 | |
| CN | 110597970 B | * 4/2023 | G06F 16/332 |

OTHER PUBLICATIONS

Arndt et al, "Tethered to the EHR: primary care physician workload assess-ment using EHR event log data and time-motion observations," Annals of Family Medicine, Sep. 2017, 8 pages.
(Continued)

*Primary Examiner* — Feng-Tzer Tzeng
(74) *Attorney, Agent, or Firm* — Fish & Richardson P.C.

(57) ABSTRACT

Methods, systems, and apparatus, including computer programs encoded on computer storage media, for extracting entities from conversation transcript data. One of the methods includes obtaining a conversation transcript sequence, processing the conversation transcript sequence using a span detection neural network configured to generate a set of text token spans; and for each text token span: processing a span representation using an entity name neural network to generate an entity name probability distribution over a set of entity names, each probability in the entity name probability distribution representing a likelihood that a corresponding entity name is a name of the entity referenced by the text token span; and processing the span representation using an entity status neural network to generate an entity status probability distribution over a set of entity statuses.

20 Claims, 3 Drawing Sheets

(51) Int. Cl.
G06F 40/295 (2020.01)
G06N 3/045 (2023.01)

(56) References Cited

OTHER PUBLICATIONS

Bahdanau et al, "Neural machine translation by jointly learning to align and translate," arXiv, Mar. 22, 2015, 15 pages.
Bengio et al, "Scheduled sampling for se-quence prediction with recurrent neural networks," NIPS, 2015, 9 pages.
Chen et al, "The best of both worlds: Combining recent advances in neu-ral machine translation," arXiv, Apr. 26, 2018, 12 pages.
Chiu et al, "Named entity recognition with bidirectional lstm-cnns," Transactions of the Association for Computational Linguistics, Jul. 1, 2016, 14 pages.
Cho et al, "Learning Phrase Representations using RNN Encoder-Decoder for Statistical Machine Translation," arXiv, Jun. 3, 2014, 14 pages.
Collobert et al, "Natural language processing (almost) from scratch," J. Mach. Learn. Res., Aug. 2011, 45 pages.
Devlin et al, "BERT: Pre-training of deep bidirectional transformers for language understanding," arXiv, Oct. 11, 2018, 14 pages.
Du et al, "Extracting Symptoms and their status for clinical conversations," Google Inc., Jun. 5, 2019, 21 pages.
Finley et al, "An automated medical scribe for documenting clinical encounters," Proceedings of the Annual Conference of the North American Chapter of the Association for Computational Linguistics, Jun. 2018, 5 pages.
Finley et al, "From dictations to clinical reports using machine translation," Association for Computational Linguistics, Jun. 2018, 8 pages.
github.com [online], "DeLFT," Dec. 17, 2018, retrieved on May 26, 2020, retrieved from URL: <https:// github.com/kermitt2/delft/blob/ 35a645904015b46e6c22f5202cdfaf7045ce6f58/Readme.Md>, 23 pages.
Huang et al, "Bidirectional LSTM-CRF models for sequence tagging," arXiv, Aug. 9, 2015, 10 pages.
Kingma et al, "ADAM: A method for stochastic optimization," arXiv, Jan. 30, 2017, 15 pages.
Lample et al, "Neural architectures for named entity recognition," arXiv, Apr. 7, 2016, 11 pages.
Liu et al, "Natural Language Processing, Electronic Health Records, and Clinical Research," Springer Science & Business Media, 2012, pp. 293-310.
Ma et al, "End-to-end sequence labeling via bi-directional lstm-cnns-crf," arXiv, May 29, 2016, 12 pages.
Nallapati et al., "Abstractive text summarization using sequence-tosequence rnns and beyond," arXiv, Aug. 26, 2016, 12 pages.
Nothman et al, "Transforming wikipedia into named entity training data," Proceedings of the Australasian Language Technology Association Workshop, 2008, 9 pages.
Patel et al, "Annotation of a large clinical entity corpus," Association for Computational Linguistics, Oct. 2018, 10 pages.
PCT International Preliminary Report on Patentability in International Application No. PCT/US2020/018899, dated Aug. 10, 2021, 8 pages.
PCT International Search Report and Written Opinion in International Application No. PCT/US2020/018899, dated Sep. 6, 2020, 10 pages.
Peters et al, "Semi-supervised sequence tagging with bidirectional language models," arXiv, Apr. 29, 2017, 10 pages.
Seo et al, "Bidirectional attention flow for machine comprehension," arXiv, Feb. 7, 2017, 13 pages.
Soravit et a, "Multi-task learning for sequence tagging: An empirical study," arXiv, Aug. 13, 2018, 17 pages.
Sutskever et al, "Sequence to sequence learning with neural networks," NIPS, 2014, 9 pages.
Uzuner et al, "2010 i2b2/va challenge on concepts, assertions, and relations in clinical text," Journal of American Medical Informatics Association, Jun. 16, 2011, 5 pages.
Vaswani et al, "Attention is all you need," NIPS, 2017, 11 pages.
Vinyals et al, "A neural conversational model," arXiv, Jul. 22, 2015, 8 pages.
Wachter et al, "To combat physician burnout and improve care, fix the electronic health record," Harvard Business Review, Mar. 30, 2018, 7 pages.
wikipedia.com [online], "Multi-Task Learning", Feburary 19, 2019, retreived on May 26, 2020, dated Feb. 19, 2019, retreived from URL: <https://en.wikipedia.org/w/index.php?title=Multi-tasklearning&oldid=883916203>, 6 pages.
Xu et al, "The burnout crisis in american medicine," The Atlantic, May 11, 2018, 8 pages.
Yang et al, "Transfer learning for sequence tagging with hierarchical recurrent networks," arXiv, Mar. 18, 2017, 10 pages.

* cited by examiner

LEARNING TO EXTRACT ENTITIES FROM CONVERSATIONS WITH NEURAL NETWORKS

CROSS-REFERENCE TO RELATED APPLICATION

This application is a national phase entry under 35 U.S.C. 371 of PCT Application Serial No. PCT/US2020/018899, filed Feb. 19, 2020, which claims priority to U.S. Patent Application No. 62/807,741, filed on Feb. 19, 2019. The entirety of each of the foregoing is incorporated by reference.

BACKGROUND

This specification relates to extracting entities from text using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that labels conversation transcript data. In particular, the conversation transcript data is a transcript of some or all of a conversation between two or more participants. The system can generate labels that extract the relevant information from the conversation, e.g., the entities referenced in the conversation and the statuses of one or more of those participants with respect to the referenced entities.

As one particular example, the conversation transcript data can be clinical conversation transcript data that is a transcript of some or all of a clinical conversation between a patient and a clinician, e.g., a physician, and, optionally, one or more other people. The system can generate labels that extract the relevant information from the clinical conversation, e.g., the symptoms referenced in the conversation and the status of the patient with respect to the referenced symptoms, and add the relevant information to electronic health record data for the patient, e.g., to a clinical notes portion of the electronic health record data. Thus, by employing the described system, clinicians do not need to manually generate clinical notes after each conversation with a patient. Alternatively, the labels generated by the system can be used to augment a note generated by a clinician or assist a clinician in generating a medical note, e.g. by suggesting symptoms and statuses that should be mentioned in the note.

Particular embodiments of the subject matter described in this specification can be implemented so as to realize one or more of the following advantages.

Conventional approaches to labelling text sequences may employ tagging models that directly attempt to identify which text tokens in the input should be assigned which label. While this approach may be effective when the label space is small, these conventional approaches have poor accuracy when the label space is large, e.g., is a cross-product of multiple individual label spaces. As a particular example, when there are many possible symptoms and each symptom can have several possible statuses, the resulting label space of (symptom name, status) pairs becomes very large. The described systems, however, instead first identify relevant portions of the input sequence and their context ("feature representations") and then, for each identified relevant portion, generate each portion of the label for the relevant portion in parallel. Thus, the system makes two parallel predictions instead of one prediction over the cross-product space between the two prediction spaces. This allows the system to make accurate predictions even when the cross-product space is very large. Additionally, directly modeling the cross-product space by making one prediction over the entire cross-product space can result in data sparsity when the amount of training data available is limited, resulting in even worse performance after training. By instead making two parallel predictions, the system is able to make accurate predictions even when trained on training data having only a limited corpus size.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that labels conversation transcript data. In particular, the conversation transcript data is a transcript of some or all of a conversation between two or more participants. The system can generate labels that extract the relevant information from the conversation, e.g., the entities referenced in the conversation and the statuses of one or more of those participants with respect to the referenced entities.

As one particular example, the conversation transcript data can be clinical conversation transcript data that is a transcript of some or all of a clinical conversation between a patient and a clinician, e.g., a physician, and, optionally, one or more other people. The system can generate labels that extract the relevant information from the clinical conversation, e.g., the symptoms referenced in the conversation and the status of the patient with respect to the referenced symptoms, and add the relevant information to electronic health record data for the patient, e.g., to a clinical notes portion of the electronic health record data.

For example, the possible statuses can include any of: currently experiencing the symptom, not experiencing the symptom, and not relevant to the patient's health (or "none"). In some cases, the symptoms that are labeled as none are not added to the electronic health record data because they are not relevant to the patient's health.

Generally, however, the labels can be any type of label that is relevant to the health of the patient or relevant to the medical treatment of the patient. In particular, the described techniques can be applied to any label space that is a cross-product of multiple individual labels, i.e., where each label is a combination of two or more individual labels, each of which is selected from a different vocabulary or set of possible labels.

As another particular example, the conversation transcript data can be transcript data between a customer service representative and a customer and the transcript can be of some or all of a conversation between the customer service representative and the customer about a service or a product. The system can generate labels that extract the relevant information from the conversation, e.g., the potential issues with the service or product that are referenced in the conversation and the status of the customer with respect to the potential issue, i.e., whether the customer is experiencing or has experienced the potential issue with the service or product, and add the relevant information to data that documents issues encountered by customers. Thus, the customer service representative does not need to manually generate notes after each conversation with a customer.

The technical effects achieved by some of the embodiments may facilitate documentation tasks in different environments, for example in a clinical environment, based on speech input. Entity names and the associated status may be extracted with a higher precision. In a clinical conversation, symptoms and the associated status are extracted with a higher precision as compared to existing techniques.

Figure 1:
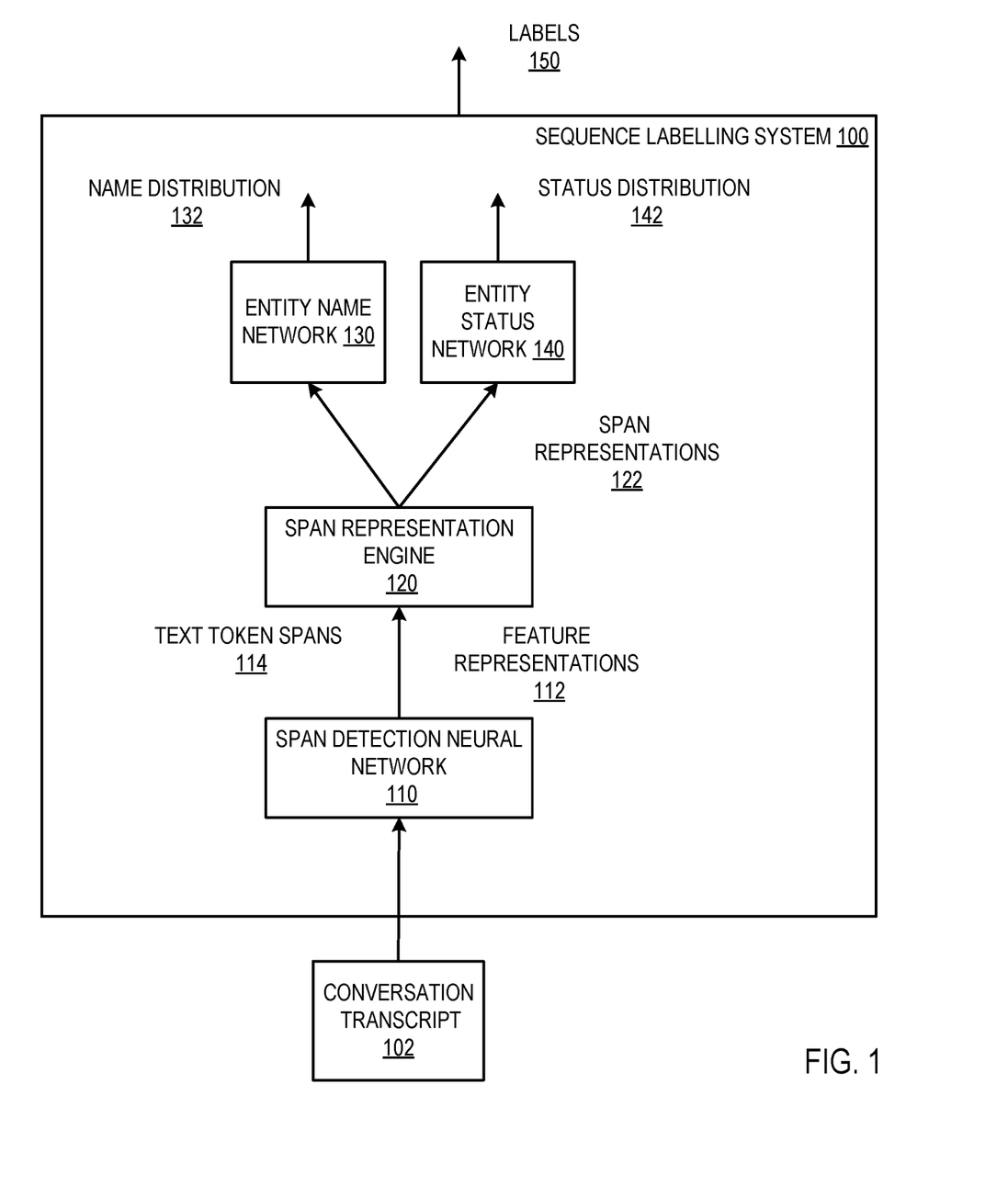
FIG. 1 shows an example conversation transcript labelling system.

FIG. 1 shows an example conversation transcript labelling system 100. The conversation transcript labelling system 100 is an example of a system implemented as computer programs on one or more computers in one or more locations in which the systems, components, and techniques described below are implemented.

The system 100 receives a conversation transcript sequence 102 from a conversation transcript and processes the conversation transcript sequence 102 to generate labels 132 that extract the relevant information from the conversation transcript.

The conversation transcript sequence 102 is a sequence of text tokens, e.g., characters, sub-word units (e.g., word pieces or other portions of whole words), words, or phrases from the conversation. The conversation transcript sequence can be a transcript of the whole conversation or a portion of the conversation. In some cases, the system 100 receives the conversation transcript sequence 102. In some other cases, the system 100 receives the audio of the conversation and generates the transcript sequence 102, e.g., using a conventional automatic speech recognition (ASR) technique.

As part of labelling the conversation transcript sequence 102, the system 100 processes the conversation transcript sequence 102 using a span detection neural network 110.

The span detection neural network 110 is configured to process the conversation transcript sequence 102 to generate a respective feature representation for each of the text tokens in the sequence and process the respective feature representations to generate a set of text token spans 114.

As used in this specification, the "representation" and, as will be introduced later, "embedding," refer to an ordered collection of numeric values, e.g., vectors or matrices of floating point or other numeric values, that represent an input, e.g., that represent an input text token or that represent a span of one or more text tokens.

Each of the text token spans 114 includes one or more consecutive text tokens from the sequence of text tokens that the system 100 has determined reference some entity of a particular type.

For example, when the conversation is a clinical conversation, the particular type of entity is symptoms, i.e., symptoms of diseases or other medical conditions. Thus, the output of the span detection neural network 110 is a set of text token spans 114 in the conversation transcript sequence that are predicted to reference some symptom, without any prediction about which symptom is referenced by which text token span.

As another example, when the conversation is a conversation between a customer and a customer service agent, the particular type of entity can be potential issues with products or services. Thus, the output of the span detection neural network 110 is a set of text token spans 114 in the conversation transcript sequence that are predicted to reference some issue, without any prediction about which issue is referenced by which text token span.

For each text token span 114 in the set, a span representation engine 120 of the system 100 generates a span representation 122 from the respective feature representations for the consecutive text tokens in the text token span 114. As will be discussed in more detail below, the span representation engine 120 can aggregate the feature representations in any of a variety of ways to generate a given span representation.

For each text token span 114 in the set, the system 100 then (1) processes the span representation 122 for the span using an entity name neural network 130 to generate an entity name probability distribution 132 over a set of entity names and (2) processes the span representation 122 for the span using an entity status neural network 140 to generate an entity status probability distribution 142 over a set of entity statuses.

Each probability in the symptom name probability distribution 132 represents the likelihood that a corresponding symptom name is the name of the symptom referenced by the text token span 114. Similarly, each probability in the symptom status probability distribution 142 represents the likelihood that a corresponding symptom status is the status for the patient of the symptom referenced by the text token span 114.

In some implementations, both the entity name neural network 130 and the entity status neural network 140 consist of respective single softmax layers that map the span representation 122 to the corresponding probability distribution, each with a separate set of parameters.

In other words, in these implementations, the entity name neural network 130 consists of an entity name softmax layer configured to: generate, from an input span representation, a respective logit for each entity name in a set of possible entity names; and generate, from the respective logits for each of the entity names, the entity name probability distribution while the entity status neural network 140 consists of an entity status softmax layer configured to generate, from an input span representation, a respective logit for each entity status in a set of possible entity statuses; and generate, from the respective logits for each of the entity statuses, the entity status probability distribution. In other implementations, the entity name neural network 130, the entity status neural network 140, or both, include one or more additional layers, e.g., fully-connected layers, that transform the span representation before it is provided as input to the corresponding softmax layer.

Thus, instead of directly predicting an entity name—entity status pair, the system 100 predicts the name of the entity and the status of the entity in parallel using different neural networks, e.g., using parallel soft-max layers each with their own parameters.

By making predictions using the technique above, the neural network model can be trained to perform the task even when the training data that is available for the task is limited. This is achieved at least in part because of two aspects of the described technique: first, by splitting the task into two hierarchical stages of identifying the spans and then predicting the entity name—entity status pair associated with the identified spans and second, splitting the prediction of the entity name—entity status pair into independent tasks.

The system 100 can then generate the labels 150 by selecting an entity name and an entity status for each text token span from the corresponding distributions, e.g., by selecting the name and the status with the highest probabilities or by sampling from the distributions.

Figure 2:
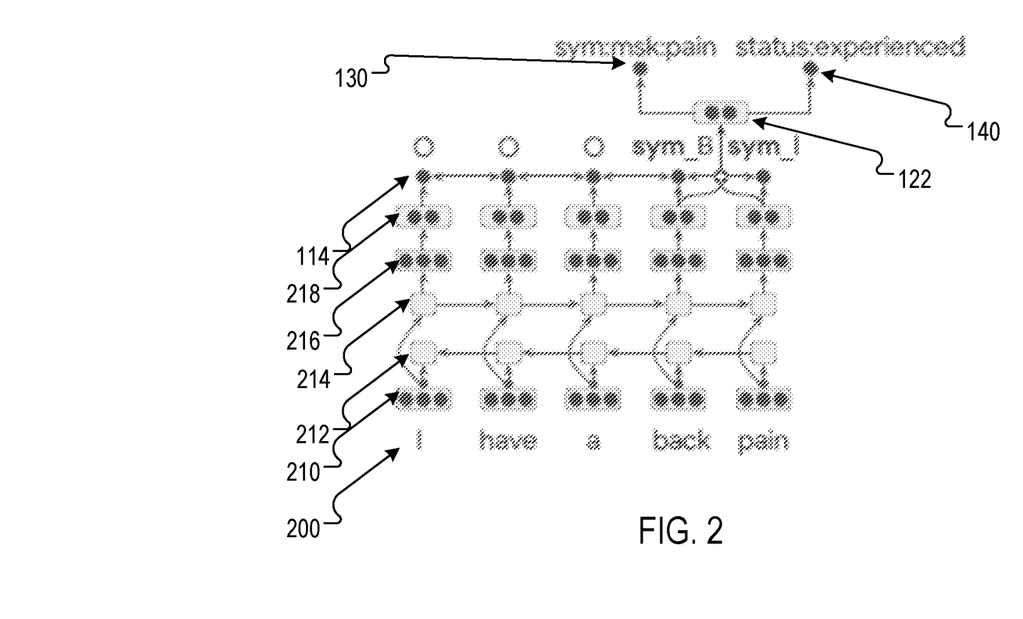
FIG. 2 illustrates the labelling of a portion of a conversation transcript.

FIG. 2 shows the labelling of an example portion 200 of a conversation transcript. In the example of FIG. 2, the conversation transcript is a clinical conversation and the example portion 200 of the transcript is a sequence of words "I have a back pain." Thus, the portion is a sequence of five tokens: [I], [have], [a], [back], [pain].

As described above, to generate the labels for the conversation, the system 100 processes the conversation transcript using the span detection neural network 110.

In the example of FIG. 2, the span detection neural network includes an embedding layer 210 configured to generate a respective embedding of each of the text tokens in the sequence, i.e., to map each of the text tokens in the sequence to a respective embedding 210. In some implementations, the embeddings are pre-trained and kept fixed by the system 100. In other implementations, the system 100 trains the embeddings as part of training the span detection neural network, which will be described in more detail below.

The span detection neural network also includes one or more recurrent neural network layers, e.g., two recurrent layers 212 and 214 as shown in FIG. 2, configured to generate a respective contextual representation of each of the text tokens in the sequence from the embeddings 210. The recurrent neural network layers can be, for example, long short-term memory (LSTM) layers, gated recurrent unit layers, or vanilla recurrent neural network layers. For example, one or more of the layers can be bi-directional recurrent neural network layers, e.g., bi-directional LSTM layers to capture context from the entire sequence of tokens.

Generally, however, the span detection neural network can include any configuration of neural network layers that are configured to generate representations of the tokens from the sequence. As a particular example, the span detection neural network can include a self-attention encoder neural network that generates the feature representations or a mixture of self-attention and recurrent layers that generate the feature representations.

In some implementations, the contextual representations are the feature representations 112.

In other implementations, like in the example of FIG. 2, the span detection neural network further processes the contextual representations to generate the feature representations 112. For example, the span detection neural network can include one or more feedforward layers, e.g., two fully-connected layers 216 and 218 as shown in FIG. 2, configured to generate the respective feature representations 112 from the respective contextual representations.

The span detection neural network then processes the respective feature representations 112 to generate a set of text token spans.

In particular, the span detection neural network includes a conditional random field (CRF) layer configured to generate the set of text token spans from the feature representations 112.

The CRF layer models the dependencies between the spans in the text. The probabilities that a next token is continuation of a current span, the end of the current span, or the beginning of a new span are represented as rows and columns in a transition matrix. A candidate sequence of token spans proposed by the previous layers is evaluated by combining the associated scores from the previous layer along with that from the CRF layer to compute the total score for that candidate sequence. During training, the transition matrix is learned by back propagating the errors like the remaining parameters of the neural network. After training, the best candidate sequence is computed efficiently using the Viterbi algorithm.

In the example of FIG. 2, the span detection neural network has identified a span beginning at the token identified by "sym_B" and ending at the token identified by "sym_I," i.e., a span that consists of the tokens "back" and "pain." That is, the span detection neural network has determined that the span [back, pain] references some symptom but has not yet determined or attempted to predict which symptom is referenced.

The span representation generation engine 120 then generates a span representation 122 of each identified span by aggregating the feature representations of the tokens in the span.

For example, for each span, the span representation 122 can be a mean of the respective feature representations for the consecutive text tokens in the text token span.

As another example, for each span, the span representation 122 can be a sum of the respective feature representations for the consecutive text tokens in the text token span.

As another example, the span representation 122 can be a hidden state of an encoder neural network that is generated by processing an encoder input that includes the respective feature representations for the consecutive text tokens in the text token span through the encoder neural network. This encoder neural network can be, for example, a recurrent neural network, a self-attention neural network, or any other neural network configured to process a set of representations to generate a hidden state.

The system then processes the span representation 122 using the entity name neural network 130 to generate an entity name probability distribution for the span and processes the span representation 122 using the entity status neural network 140 to generate the entity status probability distribution for the span.

As part of generating the labels for the transcript, the system also selects an entity name from the entity name probability distribution and an entity status from the entity name probability distribution. In the example of FIG. 2, the system has selected that the name of the symptom is "pain" (identified as sym:msk:pain in the Figure) and the status of the symptom is "experienced" (identified as status:experienced in the Figure). That is, the system effectively incorporated, through the span representation, the surrounding context of the symptom in order to accurately and, in parallel, predict the name and the status of the symptom that is being referenced by the span.

Figure 3:
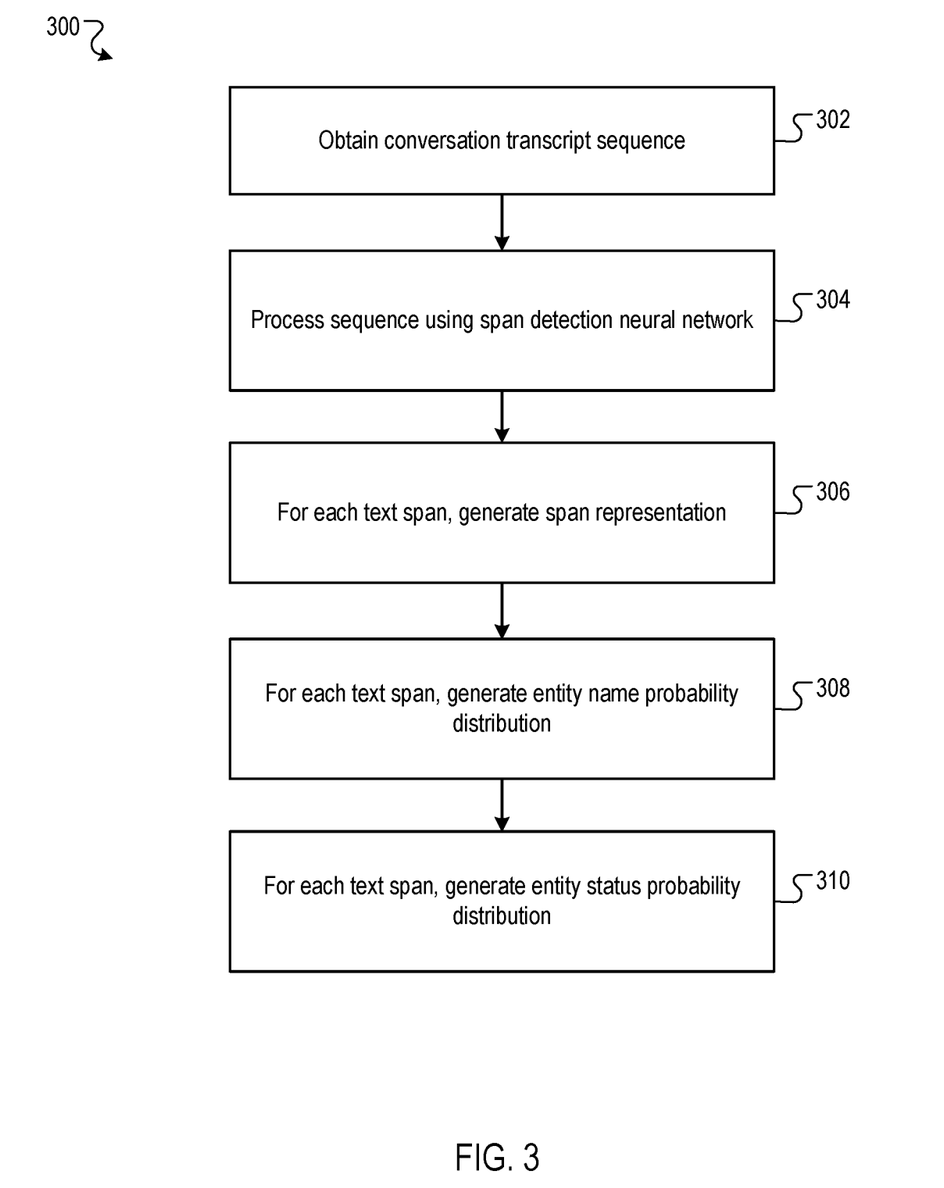
FIG. 3 is a flow diagram of an example process for labelling a conversation transcript.

FIG. 3 is a flow diagram of an example process 300 for labelling a conversation transcript. For convenience, the process 300 will be described as being performed by a system of one or more computers located in one or more locations. For example, a conversation transcript labelling system, e.g., the conversation transcript labelling system 100 of FIG. 1, appropriately programmed, can perform the process 300.

The system obtains a conversation transcript sequence (step 302) that includes a sequence of text tokens from a conversation between two or more participants.

The system processes the conversation transcript sequence using a span detection neural network (step 304) to generate a respective feature representation for each of the text tokens and a set of text token spans. As described above, each text token span includes one or more consecutive text tokens in the sequence of text tokens that reference some entity of a particular type.

For each span, the system generates a span representation for the token from the respective feature representations for the consecutive text tokens in the text token span (step 306).

For each span, the system processes the span representation using an entity name neural network to generate an entity name probability distribution over a set of entity names (step 308). As described above, each probability in the entity name probability distribution represents a likelihood that a corresponding entity name is the name of the entity referenced by the text token span.

For each span, the system processes the span representation using an entity status neural network to generate an entity status probability distribution over a set of entity statuses (step 310). As described above, each probability in the entity status probability distribution represents a likelihood that a corresponding entity status is the status of the entity referenced by the text token span.

Thus, for any given span, the system independently generates the entity name probability distribution and the entity status probability distribution.

The system can then select an entity name from the entity name probability distribution and select an entity status from the probability distribution. For example, the system can select the entity name with the highest probability in the entity name probability distribution or sample one of the entity names from the entity name probability distribution. Similarly, the system can select the entity status with the highest probability in the entity status probability distribution or sample one of the entity statuses from the entity status probability distribution.

In order for the system to effectively generate labels for conversation transcripts, i.e., to accurately extract the entities referred to in the transcripts and the status of those entities, the system trains the span detection neural network, the entity name neural network, and the entity status neural network on training data.

In particular, system trains the span detection neural network, the entity name neural network, and the entity status neural network jointly on labeled training data using multitask learning.

In more detail, the labeled training data includes, for each of a set of training conversation transcripts, reference locations of one or more entities in the transcript and a reference status of each of the one or more entities. That is, the training data identifies, for each of one or more entities, which tokens form the span that refers to the entity and a reference status for the entity in the context of the transcript.

The system then trains the three neural networks end-to-end to jointly optimize a multi-task learning objective that measures the performance of the neural networks on the three tasks: (i) generating entity spans, (ii) determining entity names, and (iii) determining entity statuses.

For example, the system can train the neural networks to minimize the following loss function:

$$\text{loss} = -\alpha \log P(h)) + \sum_{\{(y^{s_x}, y^{s_x})\}} -\log P(y^{s_x} \mid h) - \log P(y^{s_t} \mid h)$$

where h are the feature representations for the tokens in the conversation transcript, P(h) is the probability assigned to set of text spans that accurately captures the entities in the transcript, and $(y^{s_x}, y^{s_x})$ is a pair that includes an entity name for one of the symptoms referenced in the transcript and the reference status of that entity in the transcript.

In some implementations, during training, for each training conversation transcript sequence in the labeled training data, the system uses the reference location of each entity reference in the training conversation transcript sequence from the labeled training data is used to generate the span representations with probability p, while using the text token spans generated by the span detection neural network to generate the span representations with probability 1−p. The system can decrease the value of p as training progresses, i.e., in order to use the outputs of the span detection neural network more frequently as the span representations generated based on the outputs of the span detection neural network become more accurate.

Additionally, in some implementations, the system pre-trains the portion of the span representation neural network that generates the contextual representations or the portion that generates the feature representations using unsupervised learning. For example, the system can pre-train this portion of the neural network on a next turn prediction task or another unsupervised prediction task, i.e., a task for which the target outputs can be determined from unlabeled transcripts. This pre-training mechanism allows the model to learn a hidden representation for each turn in the conversation transcript and its context in the conversation. This can significantly improve the processing of conversation transcripts.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining a conversation transcript sequence comprising a sequence of text tokens from a conversation between two or more participants;
    processing the conversation transcript sequence using a span detection neural network configured to:
        process the conversation transcript sequence to generate a respective feature representation for each of the text tokens in the sequence; and
        process the respective feature representations to generate a set of text token spans, each text token span comprising one or more consecutive text tokens in the sequence of text tokens that references an entity of a particular type;
    for each text token span:
        generating a span representation from the respective feature representations for the consecutive text tokens in the text token span;
        processing the span representation using an entity name neural network to generate an entity name probability distribution over a set of entity names, each probability in the entity name probability distribution representing a likelihood that a corresponding entity name is a name of the entity referenced by the text token span, wherein the entity name neural network comprises an entity name softmax layer configured to:
            generate, from the respective feature representations, a respective logit for each entity name; and
            generate, from the respective logits for each of the entity names, the entity name probability distribution; and
        processing the span representation using an entity status neural network to generate an entity status probability distribution over a set of entity statuses, each probability in the entity status probability distribution representing a likelihood that a corresponding entity status is a status of the entity referenced by the text token span.

2. The method of claim 1, wherein the conversation is a clinical conversation, the two or more participants are at least a patient and a clinician and the entity of a particular type is a symptom entity,
    wherein processing the span representation using an entity name neural network to generate an entity name probability distribution over a set of entity names, each probability in the entity name probability distribution representing a likelihood that a corresponding entity name is a name of the entity referenced by the text token span comprises processing the span representation using a symptom name neural network to generate a symptom name probability distribution over a set of symptom names, each probability in the symptom name probability distribution representing a likelihood that a corresponding symptom name is a name of the symptom entity referenced by the text token span, and
    wherein processing the span representation using an entity status neural network to generate an entity status probability distribution over a set of entity statuses, each probability in the entity status probability distribution representing a likelihood that a corresponding entity status is a status of the entity referenced by the text token span comprises processing the span representation using a symptom status neural network to generate a symptom status probability distribution over a set of symptom statuses, each probability in the symptom status probability distribution representing a likelihood that a corresponding symptom status is a status for the patient of the symptom entity referenced by the text token span.

3. The method of claim 1, further comprising:
    for each text token span:
        selecting, using the entity name probability distribution, an entity name for the entity referenced by the text token span, and selecting, using the entity status probability distribution, an entity status for the entity referenced by the text token span.

4. The method of claim 1, wherein the span detection neural network comprises a conditional random field (CRF) layer configured to generate the set of text token spans from the respective feature representations.

5. The method of claim 1, wherein the span detection neural network comprises:
an embedding layer configured to generate a respective embedding of each of the text tokens in the sequence; and
one or more recurrent neural network layers configured to generate a respective contextual representation of each of the text tokens in the sequence from the embeddings.

6. The method of claim 5, wherein at least one of the recurrent neural network layers is a bi-directional recurrent neural network layer.

7. The method of claim 5, wherein the span detection neural network further comprises:
one or more feedforward layers configured to generate the respective feature representations from the respective contextual representations.

8. The method of claim 1, wherein the entity status neural network comprises an entity status softmax layer configured to:
generate, from the respective feature representations, a respective logit for each entity status; and
generate, from the respective logits for each of the entity statuses, the entity status probability distribution.

9. The method of claim 1, wherein the span representation is a mean of the respective feature representations for the consecutive text tokens in the text token span.

10. The method of claim 1, wherein the span representation is a sum of the respective feature representations for the consecutive text tokens in the text token span.

11. The method of claim 1, wherein the span representation is a hidden state of an encoder neural network generated by processing an encoder input comprising the respective feature representations for the consecutive text tokens in the text token span through the encoder neural network.

12. The method of claim 1, wherein the span detection neural network, the entity name neural network, and the entity status neural network have been trained jointly on labeled training data using multitask learning.

13. The method of claim 12, wherein during training, for each training conversation transcript sequence in the labeled training data, the reference location of each entity reference in the training conversation transcript sequence from the labeled training data is used to generate the span representation with probability p, and the text token span generated by the span detection neural network is used to generate the span representation with probability 1−p.

14. The method of claim 13, wherein p is decreased as training progresses.

15. One or more non-transitory computer-readable media encoded with instructions that, when executed by one or more computers, cause the one or more computers to perform operations comprising:
obtaining a conversation transcript sequence comprising a sequence of text tokens from a conversation between two or more participants;
processing the conversation transcript sequence using a span detection neural network configured to:
process the conversation transcript sequence to generate a respective feature representation for each of the text tokens in the sequence; and
process the respective feature representations to generate a set of text token spans, each text token span comprising one or more consecutive text tokens in the sequence of text tokens that references an entity of a particular type;
for each text token span:
generating a span representation from the respective feature representations for the consecutive text tokens in the text token span;
processing the span representation using an entity name neural network to generate an entity name probability distribution over a set of entity names, each probability in the entity name probability distribution representing a likelihood that a corresponding entity name is a name of the entity referenced by the text token span, wherein the entity name neural network comprises an entity name softmax layer configured to:
generate, from the respective feature representations, a respective logit for each entity name; and
generate, from the respective logits for each of the entity names, the entity name probability distribution; and
processing the span representation using an entity status neural network to generate an entity status probability distribution over a set of entity statuses, each probability in the entity status probability distribution representing a likelihood that a corresponding entity status is a status of the entity referenced by the text token span.

16. A system comprising one or more computers and one or more storage devices storing instructions that when executed by one or more computers cause the one or more computers to perform operations comprising:
obtaining a conversation transcript sequence comprising a sequence of text tokens from a conversation between two or more participants;
processing the conversation transcript sequence using a span detection neural network configured to:
process the conversation transcript sequence to generate a respective feature representation for each of the text tokens in the sequence; and
process the respective feature representations to generate a set of text token spans, each text token span comprising one or more consecutive text tokens in the sequence of text tokens that references an entity of a particular type;
for each text token span:
generating a span representation from the respective feature representations for the consecutive text tokens in the text token span;
processing the span representation using an entity name neural network to generate an entity name probability distribution over a set of entity names, each probability in the entity name probability distribution representing a likelihood that a corresponding entity name is a name of the entity referenced by the text token span, wherein the entity name neural network comprises an entity name softmax layer configured to:
generate, from the respective feature representations, a respective logit for each entity name; and
generate, from the respective logits for each of the entity names, the entity name probability distribution; and
processing the span representation using an entity status neural network to generate an entity status probability distribution over a set of entity statuses, each probability in the entity status probability distribution representing a likelihood that a corresponding entity status is a status of the entity referenced by the text token span.

17. The system of claim 16, wherein the conversation is a clinical conversation, the two or more participants are at least a patient and a clinician and the entity of a particular type is a symptom entity,
   wherein processing the span representation using an entity name neural network to generate an entity name probability distribution over a set of entity names, each probability in the entity name probability distribution representing a likelihood that a corresponding entity name is a name of the entity referenced by the text token span comprises processing the span representation using a symptom name neural network to generate a symptom name probability distribution over a set of symptom names, each probability in the symptom name probability distribution representing a likelihood that a corresponding symptom name is a name of the symptom entity referenced by the text token span, and
   wherein processing the span representation using an entity status neural network to generate an entity status probability distribution over a set of entity statuses, each probability in the entity status probability distribution representing a likelihood that a corresponding entity status is a status of the entity referenced by the text token span comprises processing the span representation using a symptom status neural network to generate a symptom status probability distribution over a set of symptom statuses, each probability in the symptom status probability distribution representing a likelihood that a corresponding symptom status is a status for the patient of the symptom entity referenced by the text token span.

18. The system of claim 16, the operations further comprising:
   for each text token span:
      selecting, using the entity name probability distribution, an entity name for the entity referenced by the text token span, and
      selecting, using the entity status probability distribution, an entity status for the entity referenced by the text token span.

19. The system of claim 16, wherein the span detection neural network comprises a conditional random field (CRF) layer configured to generate the set of text token spans from the respective feature representations.

20. The system of claim 16, wherein the span detection neural network, the entity name neural network, and the entity status neural network have been trained jointly on labeled training data using multitask learning.

* * * * *